(12) United States Patent
Obala Bhuvanesh et al.

(10) Patent No.: US 9,411,387 B2
(45) Date of Patent: Aug. 9, 2016

(54) PRE-CHARGING MECHANISM FOR MULTI-INPUT SWITCHING CHARGER

(71) Applicant: BROADCOM CORPORATION, Irvine, CA (US)

(72) Inventors: Prasanna Obala Bhuvanesh, Fort Collins, CO (US); Jay Edward Ackerman, Fort Collins, CO (US); Michael Owen Baker, Fort Collins, CO (US); Ryan Michael Desrosiers, Fort Collins, CO (US)

(73) Assignee: Broadcom Corporation, Irvine, CA (US)

( * ) Notice: Subject to any disclaimer, the term of this patent is extended or adjusted under 35 U.S.C. 154(b) by 172 days.

(21) Appl. No.: 14/154,061

(22) Filed: Jan. 13, 2014

(65) Prior Publication Data

US 2015/0137766 A1    May 21, 2015

Related U.S. Application Data

(60) Provisional application No. 61/905,790, filed on Nov. 18, 2013.

(51) Int. Cl.
  *H02J 7/00* (2006.01)
  *H02J 7/14* (2006.01)
  *G06F 1/00* (2006.01)
  *G06F 1/26* (2006.01)

(52) U.S. Cl.
  CPC ............... *G06F 1/263* (2013.01); *H02J 7/007* (2013.01); *H02J 7/0068* (2013.01); *G06F 1/26* (2013.01); *G06F 1/266* (2013.01); *H02J 7/0036* (2013.01); *H02J 7/0057* (2013.01); *H02J 2007/0059* (2013.01); *H02J 2007/0095* (2013.01)

(58) Field of Classification Search
  USPC ......... 320/137, 138, 107, 134, 162, 126, 128, 320/163, 145, 164, 166, 135, 147, 114, 139, 320/141, 152, 127, 133, 140, 143, 157; 307/43, 44, 110, 112, 31; 323/284, 323/282, 422; 324/422
  See application file for complete search history.

(56) References Cited

U.S. PATENT DOCUMENTS

| | | | | |
|---|---|---|---|---|
| 6,130,813 | A * | 10/2000 | Kates ..................... | H02H 9/001 307/80 |
| 6,272,029 | B1 * | 8/2001 | Hirose .................. | G11C 5/145 307/110 |
| 6,433,619 | B2 * | 8/2002 | Akita ........................... | 307/110 |
| 2006/0192437 | A1 * | 8/2006 | Tolle ................ | H03K 17/04123 307/113 |
| 2007/0035180 | A1 * | 2/2007 | Jang ..................... | H03K 17/161 307/112 |

(Continued)

*Primary Examiner* — Alexis A Boateng
(74) *Attorney, Agent, or Firm* — McDermott Will & Emery LLP (57) ABSTRACT

A circuit for a switching charger includes multiple input supply nodes, and a number of charging paths. Each input supply node is connectable to a power source. Each charging path may include a middle node connected to a coupling switch and a pass transistor. The coupling switch may be configured to activate a corresponding charging path of the charging paths. A pre-charging switch may be coupled to a corresponding middle node of each charging path. The pass transistor of an activated one of the charging paths may be configured to provide a switching voltage at an input of a charging sub-circuit. The pre-charging switch may be configurable to pre-charge a middle node of a non-activated path to a high voltage to prevent an unwanted high current passing through a body diode of a corresponding pass transistor of the non-activated path.

29 Claims, 6 Drawing Sheets

(56) References Cited

U.S. PATENT DOCUMENTS

| | | | |
|---|---|---|---|
| 2007/0188139 A1* | 8/2007 | Hussain | H02J 7/0073 320/128 |
| 2008/0067995 A1* | 3/2008 | Chua-Eoan | H02M 3/158 323/284 |
| 2010/0127663 A1* | 5/2010 | Furukawa | B60L 3/0046 320/134 |
| 2010/0207675 A1* | 8/2010 | Miyano | H03L 7/0812 327/175 |
| 2011/0115438 A1* | 5/2011 | Liu | B60L 3/0046 320/135 |
| 2012/0187898 A1* | 7/2012 | Nysen | H01M 10/052 320/103 |
| 2013/0113430 A1* | 5/2013 | Kim | H02J 7/0032 320/134 |
| 2013/0200851 A1* | 8/2013 | Bieler | H02J 7/0063 320/126 |

* cited by examiner

PRE-CHARGING MECHANISM FOR MULTI-INPUT SWITCHING CHARGER

CROSS-REFERENCE TO RELATED APPLICATIONS

This application claims the benefit of priority under 35 U.S.C. §119 from U.S. Provisional Patent Application 61/905,790 filed Nov. 18, 2013, which is incorporated herein by reference in its entirety.

TECHNICAL FIELD

The present description relates generally to power supplies, and more particularly, but not exclusively, to a pre-charging mechanism for multi-input switching chargers.

BACKGROUND

Switching chargers can form an important part of many devices, for example, communication devices such as DSL modems and wireless portable devices including cellular telephones, tablets, phablets, laptops, and the like. For example, a mobile communications device may have multiple supply inputs connectable to an external adaptor, a powermat, a universal serial bus (USB) cable, or a wireless power dongle. Therefore, the switching chargers need to support multiple inputs, of which only one may be active at any time. The existing switching chargers may suffer from a number of shortcomings, in particular, reliability issues, startup power consumption, safety, and/or low efficiency. These shortcomings may be caused by current surge through the circuitries connected to the inactive input paths.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

The subject technology may provide a method and implementation for pre-charging the isolation nodes of inactive inputs of a multi-input switching charger. The pre-charging can be carried out prior to the start of charging from a higher supply voltage. The pre-charging can prevent unwanted high currents flowing from the active input supply to one or more inactive paths, as discussed in more detail herein. The subject technology may include a number of advantageous features, including layout advantages, circuit advantages, system advantages, and product advantages. The layout advantages include enhanced reliability of the metallization and reduction of metal sizing requirement for reduced current paths. With regard to circuit advantages, the reliability of the output switching devices may be significantly enhanced. At the system level, the subject technology reduces startup power consumption, improves overall efficiency of the charger, and enhances system safety and lifetime. The product level advantages include prevention of a weak adapter from collapsing due to the high startup currents.

Figure 1A:
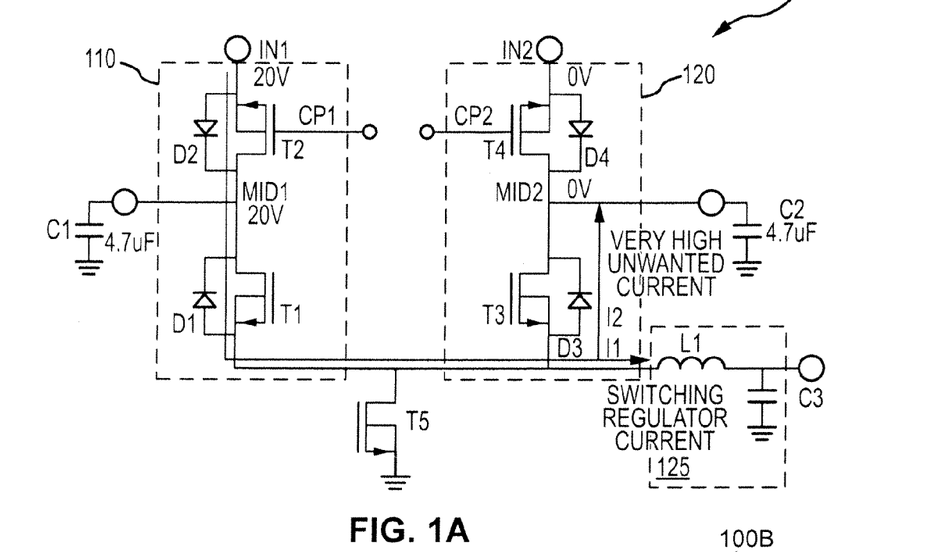
FIG. 1A illustrates an example of a multi-input switching charger circuit in accordance with one or more implementations.

FIG. 1A illustrates an example of a multi-input switching charger circuit 100A in accordance with one or more implementations of the subject technology. The multi-input switching charger circuit 100A may include multiple (e.g., two or more) input supply nodes such as IN1 and IN2 (additional supply nodes are not shown for simplicity), each of which is connectable to a power source, and a number of charging paths (e.g., 110 and 120, additional charging path are not shown for simplicity). Examples of the power source may include an adaptor, a powermat, a universal-serial bus (USB), or a wireless power dongle. Each charging path (e.g., 110 or 120) may include a middle node (e.g., MID1 or MID2) connected to a coupling switch such as T2 or T4, for charging paths 110 or 120, respectively, and a pass transistor such as T1 or T3, for charging paths 110 or 120, respectively. The middle nodes MID1 and MID2 may be coupled through large (e.g., 4.7 µF) coupling capacitors C1 and C2 to ground potential. The coupling switches T2 or T4 may be configured to activate a corresponding charging path (e.g., 110 or 120).

In some aspects, examples of the pass transistors T1 and T3 and the coupling switches T2 and T4 may include NMOS transistors. Diodes D1-D4 shown separately from the transistors T1-T4, are body diodes that are structurally part of the respective transistors T1-T4, in which the bulk is connected to the source node. For example, the anode of each diode (e.g., D3) is formed by the bulk of the respective transistor (e.g., T3) and the cathode of that diode is formed by the n-diffusion drain node of the respective transistor. The charging path 110 or 120 may be activated by coupling a node CP1 or CP2 (e.g., gate of transistors T2 or T4) to a proper voltage.

In one or more aspects, the pass transistor T1 of an activated charging path 110 may be configured to provide a switching voltage at an input of a charging sub-circuit 125, which includes an inductor L1 and a capacitor C3. The pass transistor T1 may be coupled to a switching circuit (not shown in FIG. 1A for simplicity) that is configured to control the pass transistor T1 of the activated charging path 110 to provide a switching voltage at an input of the charging sub-circuit 125. The inductor L1 and the capacitor C3 of the charging sub-circuit 125, in conjunction with the diode connected transistor T5, may convert the switching voltage to a DC voltage. The charging sub-circuit 125 may provide the DC voltage, for example, for charging one or more batteries of a device, such as a communication device or other devices, at an output of the charging sub-circuit 125.

Upon activation of the path 110, the voltage at MIDI rises to the high voltage value (e.g., 20V) of the input supply at IN1, and provides, to the charging sub-circuit 125, a current I1 (e.g., a switching regulator current) that can be used to charge one or more batteries. With a negligible voltage drop on the pass transistor T1, the same high voltage (e.g., 20V) may appear at the anode of diode D3, the cathode of which is at ground potential (since the charging path 120 is inactive). This high voltage forward biases the diode D3 and causes a large unwanted current I2 to pass through this diode. This large unwanted current I2 may result in loss of efficiency and reliability of the charging circuit 100A.

Figure 1B:
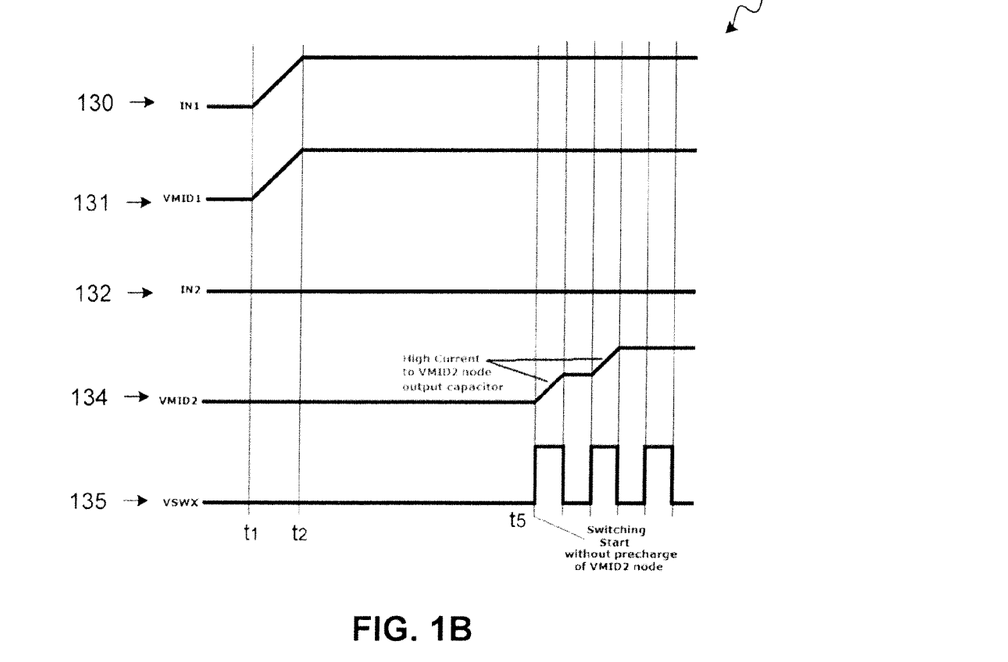
FIG. 1B illustrates an example plot of a number of waveforms of the multi-input switching charger circuit of FIG. 1A in accordance with one or more implementations.

FIG. 1B illustrates an example plot 100B of a number of waveforms 130-135 of the multi-input switching charger circuit 100A of FIG. 1A in accordance with one or more implementations of the subject technology. The waveform 130 shows the voltage at the input supply node IN1 of FIG. 1A, which ramps ups during $t_1$-$t_2$ and reaches a constant value (e.g., 20V) at time $t_2$. The waveform 131 depicts the voltage VMID1 at the middle node MID1 of FIG. 1A. The coupling switch T2 is closed at time $t_1$ allowing the voltage VMID1 to follow the voltage at the input supply node IN1. The voltage at the input supply node IN2 of FIG. 1A, shown by waveform 132, is at zero voltage, so the charging path 120 of FIG. 1A is inactive. The waveform 134 shows the voltage VMID2 at the middle node MID2 of FIG. 1A. The voltage VMID2 is zero until time $t_5$, which is the start of the switching of the pass transistor T1 of FIG. 1A, and increase as the capacitor C2 charges up during each high-cycle of the switching voltage at the input of the charging sub-circuit 125 of FIG. 1A, shown by the waveform 135. The unwanted high current to node MID2, through diode D3 of FIG. 1A, flows during the cycles of the switching voltage that the voltage VMID2 has not reached the voltage VMID1.

In one or more implementations, a pre-charging switch may be coupled to the middle nodes of the charging paths 110 and 120, and may be configured to pre-charge a middle node of a non-activated path (e.g., 120) to a high voltage. The high voltage may be a voltage (e.g., 20V) of an input supply node (e.g., IN1) connected to the activated path 110, and can prevent diode D3 from conducting excessive current during startup. Therefore, no more unwanted current (e.g., I2) can pass through the diode D3.

Figure 2A:
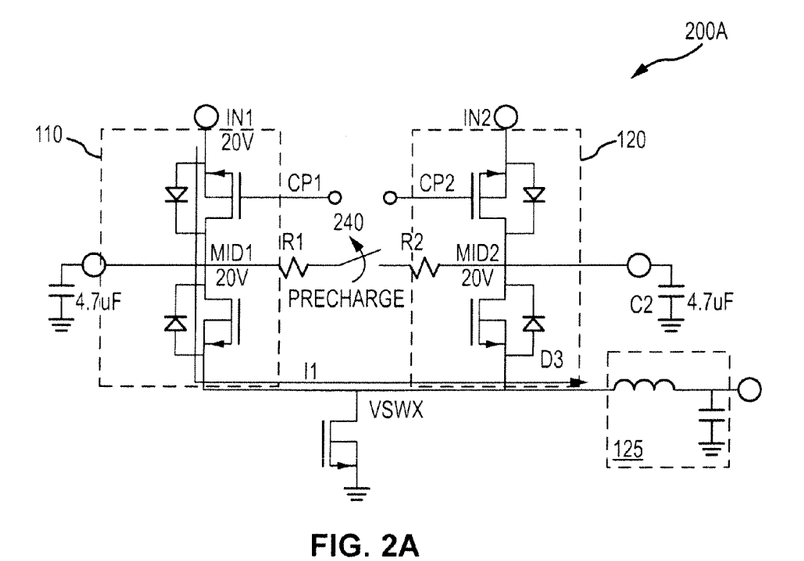
FIG. 2A illustrates an example of a multi-input switching charger circuit using a pre-charging switch in accordance with one or more implementations.

FIG. 2A illustrates an example of a multi-input switching charger circuit 200A using a pre-charging switch 240 in accordance with one or more implementations of the subject technology. The multi-input switching charger circuit 200A is similar to the multi-input switching charger circuit 100A of FIG. 1A, except for the addition of the pre-charging switch 240. The pre-charging switch 240 may be coupled to the corresponding middle nodes MID1 and MID2 of the charging paths 110 and 120 (and other charging paths, not shown here for simplicity) through one or more coupling resistors (e.g., R1 and R2). The pre-charging switch 240 may be activated for a pre-determined period of time prior to the provision of the switching voltage (e.g., $t_5$ of FIG. 1B) at the input of the charging sub-circuit 125. As discussed above, the pre-charging switch 240, once activated may couple MID2 to the voltage at MID1 (e.g., 20V), which prevents diode D3 from conducting during the first few high cycles of the switching voltage (e.g., 135 of FIG. 1B). This can facilitate for the multi-input switching charger circuit 200A to operate reliably and with high efficiency.

Figure 2B:
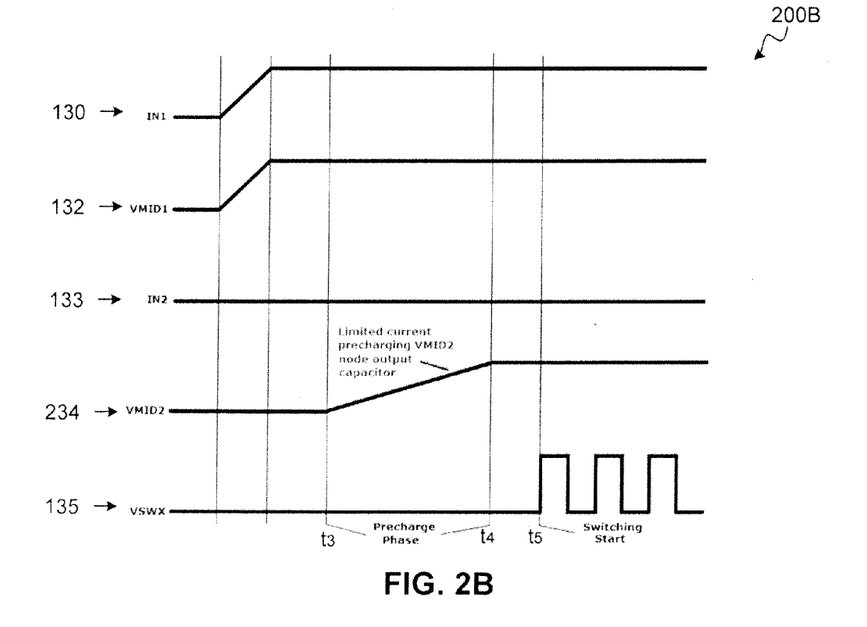
FIG. 2B illustrates an example plot of a number of waveforms of the multi-input switching charger circuit of FIG. 2A in accordance with one or more implementations.

FIG. 2B illustrates an example plot 200B of a number of waveforms 130-133, 234, and 135 of the multi-input switching charger circuit 200A of FIG. 2A in accordance with one or more implementations. The descriptions of the waveform 130-133 and 135 are the same as discussed above with respect to FIG. 1B. The waveform 234 shows the voltage VMID2 of at the middle node MID2 of FIG. 2A. The voltage VMID2 is zero at time $t_3$, which is the start of the conducting of the pre-charging switch 240 of FIG. 2A, and increase as the capacitor C2 of FIG. 2A charges up during the period $t_3$-$t_4$, and reaches a constant value approximately equal to the voltage at MID1 (e.g., VMID1). During the charging period $t_3$-$t_4$, a well-controlled charging current may pass through the pre-charging switch 240. However, during the switching of the voltage at the input of the charging sub-circuit 125, no unwanted current passes through the diode D3 of FIG. 2A.

Figure 2C:
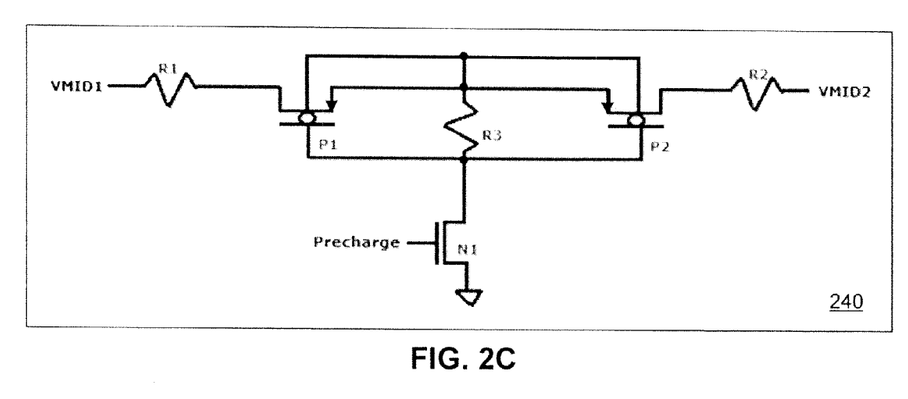
FIG. 2C illustrates an example of an implementation of a pre-charging switch of a multi-input switching charger circuit in accordance with one or more implementations.

FIG. 2C illustrates an example of the charging switch 240 of the multi-input switching charger circuit 200A of FIG. 2A in accordance with one or more implementations of the subject technology. The charging switch 240 may be implemented, for example, by using two PMOS transistors P1 and P2 coupled via resistors R1 and R2 to middle nodes MID1 and MID2 of FIG. 2A, with voltages of VMID1 and VMID2. Gate nodes of the PMOS transistors P1 and P2 may be coupled together. The body and source nodes of the PMOS transistors P1 and P2 may be tied together and coupled through a resistor R3 to the gate nodes of PMOS transistors P1 and P2. The gate nodes of P1 and P2 may then be coupled to a switch N1, when activated, to the ground potential. In some implementations, the switch N1 is an NMOS transistor and can be activated by applying a precharge signal at a gate node of the NMOS transistor.

Figure 3:
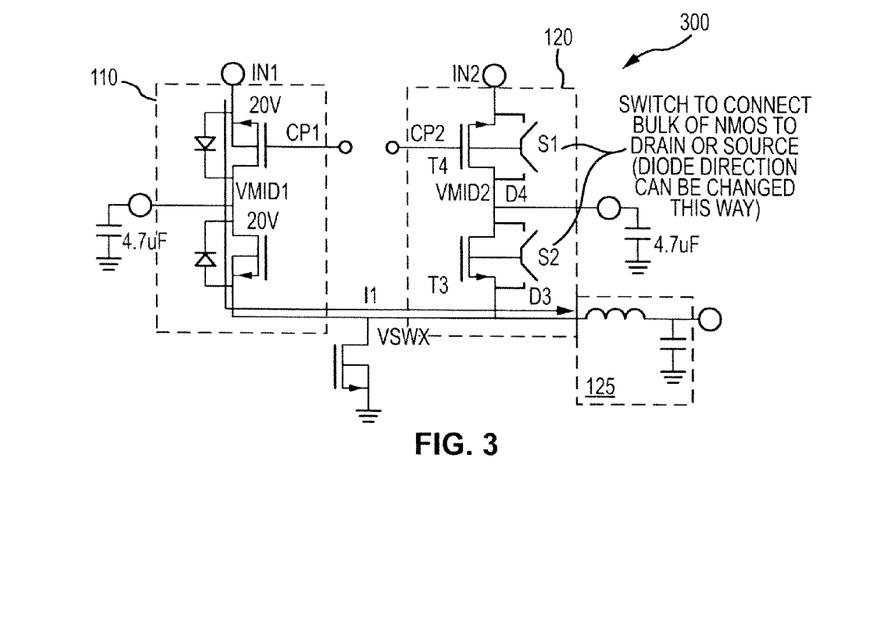
FIG. 3 illustrates an example of a multi-input switching charger circuit using bulk-connection switches in accordance with one or more implementations.

FIG. 3 illustrates an example of a multi-input switching charger circuit 300 using bulk-connection switches S1 and S2 in accordance with one or more implementations of the subject technology. As discussed above with respect to FIGS. 1A and 2A, at the onset of the switching voltage at the input of the charging sub-circuit 125, a large unwanted current may pass through the forward biased diode D3 of FIG. 2A, which can adversely affect the reliability and efficiency of the multi-input switching charger circuit 200. The diode D3 and D4, as mentioned above, may be formed by anodes, which are the bulk of the respective NMOS transistors T3 and T4, and cathodes that can be formed by the n-diffusion drain node of the respective NMOS transistors T3 and T4.

In one or more implementations, the direction of the diodes D3 and D4 may be reversed by the bulk-connection switches S1 and S2. For example, switch S2 may be configured to reverse direction of the diode D3 by connecting the bulk of the NMOS transistor T3 to drain node of the NMOS transistor T3. Using this technique prevents large unwanted current from passing through diode D3, when the voltage at the input of the charger sub-circuit 125 is raised to a high level (e.g., voltage of the input supply node IN1). Therefore, the current I1 can flow from the active charging path 110 to the charger sub-circuit 125 without any substantial current passing through the inactive charging path 120, as the diode D3 is reverse biased by the switch S2.

Figure 4:
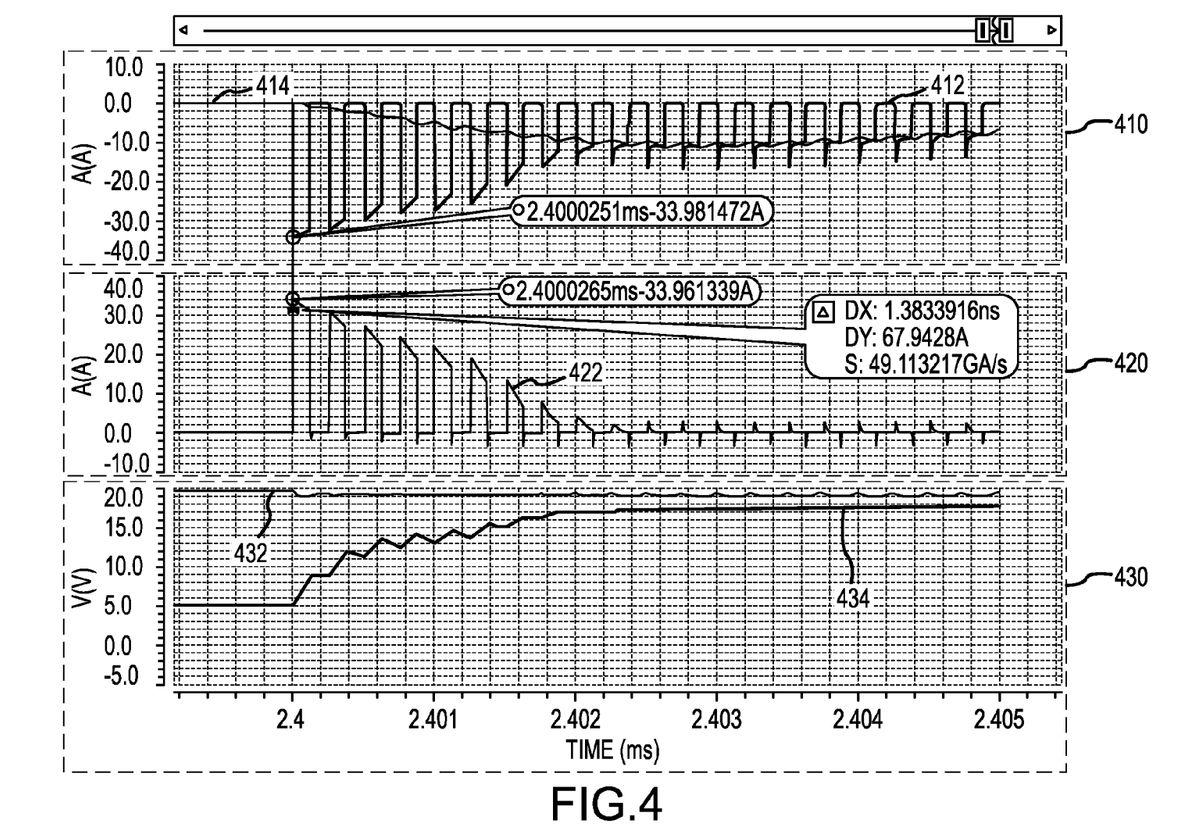
FIG. 4 illustrates example plots of a number of waveforms of the multi-input switching charger circuit of FIG. 2A in accordance with one or more implementations.

FIG. 4 illustrates example plots 410, 420, and 430 of a number of waveforms of the multi-input switching charger circuit 200A of FIG. 2A in accordance with one or more implementations of the subject technology. The plot 410 shows waveforms of currents 412 and 414, which represent current I1 out of the active charging path 110 of FIG. 2A and the useful current passing through the inductor of the charging sub-circuit 125 of FIG. 2A, respectively. The plot 420 shows a waveform of the unwanted current I2 of FIG. 1A, which flows to the capacitor C2 of FIG. 1A. This current goes away once the voltage at MID2 is raised to the voltage at MID1 of FIG. 2A by closing of the pre-charging switch 240 of FIG. 2A. The plot 430 depicts voltage levels 432 and 434 of the respective middle points MID1 and MID2 of FIG. 2A. As the switch 240 closes, the voltage level 434 of MID2 approaches the voltage level 432 of MID1.

Figure 5:
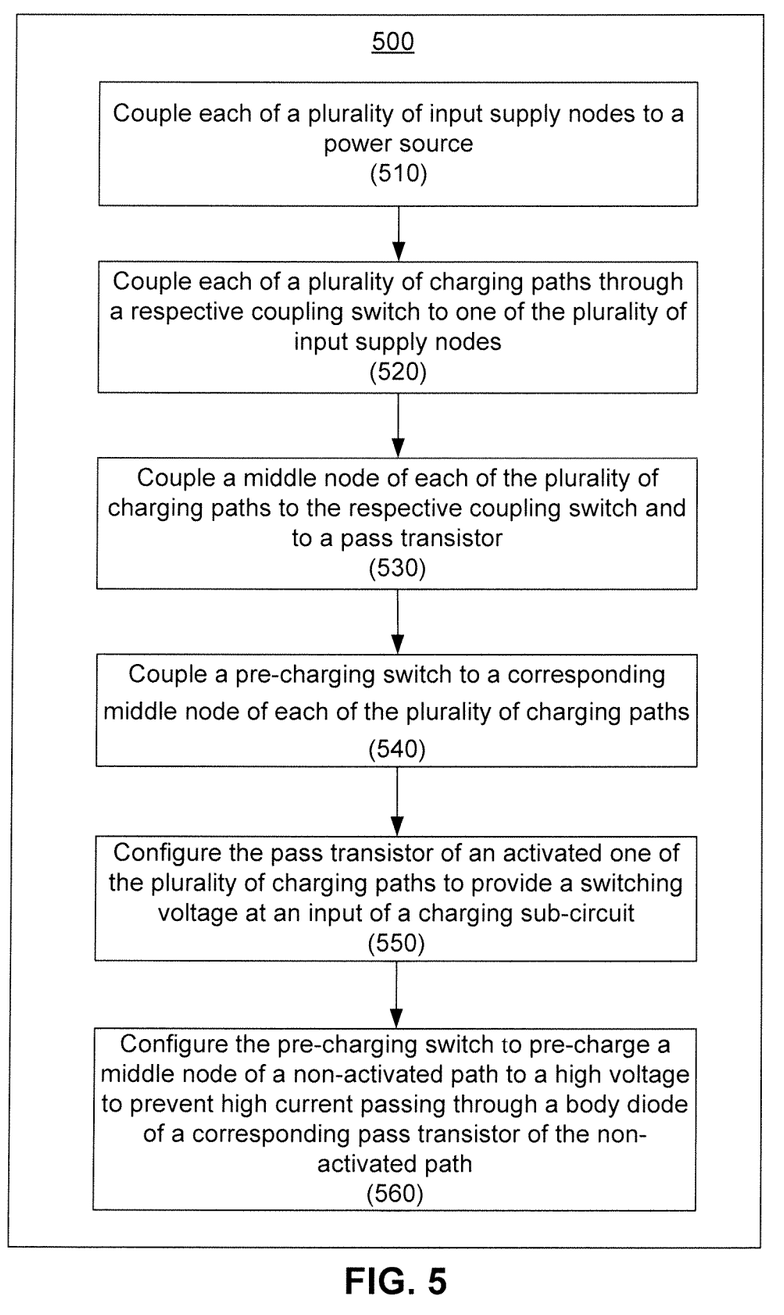
FIG. 5 illustrates an example of a method for providing a multi-input switching charger circuit in accordance with one or more implementations.

FIG. 5 illustrates an example of a method 500 for providing a multi-input switching charger circuit in accordance with one or more implementations of the subject technology. For explanatory purposes, the example method 500 is described herein reference to, but is not limited to, the multi-input switching charger circuits 100A and 200A of FIGS. 1A and 2A. Further for explanatory purposes, the blocks of the example method 500 are described herein as occurring in serial, or linearly. However, multiple blocks of the example method 500 may occur in parallel. In addition, the blocks of the example method 500 need not be performed in the order shown and/or one or more of the blocks of the example method 500 need not be performed.

Each of multiple input supply nodes (e.g., IN1 and IN2 of FIGS. 1A and 2A) may be coupled to a power source (510). Each of multiple charging paths (e.g., 110 and 120 of FIGS. 1A and 2A) may be coupled through a respective coupling switch (e.g., T2 and T4 of FIG. 1A) to one of the multiple input supply nodes (520). A middle node (e.g., MID1 or MID2 of FIGS. 1A and 2A) of each of the multiple charging paths may be coupled to the respective coupling switch and to a pass transistor (e.g., T1 and T3 of FIG. 1A) (530). The respective coupling switch may be configurable to activate a corresponding charging path of the multiple charging paths. A pre-charging switch (e.g., 240 of FIG. 2A) may be coupled to a corresponding middle node of each of the multiple charging paths (540). The pass transistor (e.g., T1 of FIG. 1A) of an activated one (e.g., 110 of FIGS. 1A and 2A) of the plurality of charging paths (e.g., 110 and 120 of FIGS. 1A and 2A) may be configured to provide a switching voltage (e.g., 135 of FIG. 1B) at an input of a charging sub-circuit (e.g., 125 of FIGS. 1A and 2A) (550). The pre-charging switch may be configured to pre-charge a middle node (e.g., MID2 of FIG. 2A) of a non-activated path (e.g., 120 of FIG. 2A) to a high voltage (e.g., voltage of MID1 of FIG. 2A) to prevent an unwanted high current (e.g., I2 of FIG. 1A) passing through a body diode (e.g., D3 FIGS. 1A and 2A) of a corresponding pass transistor (e.g., T3 of FIGS. 1A and 2A) of the non-activated path (560).

Figure 6:
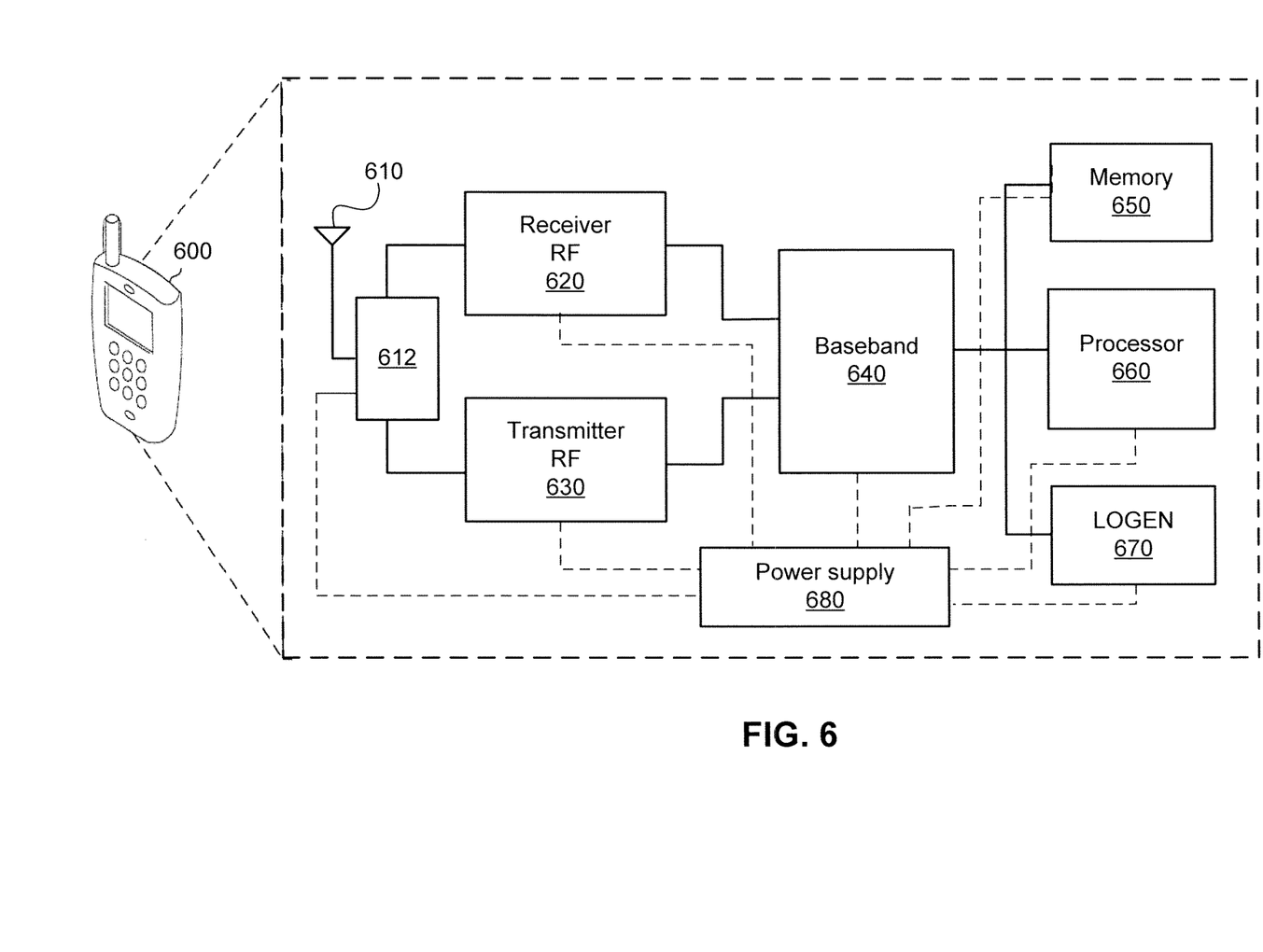
FIG. 6 illustrates an example wireless communication device in accordance with one or more implementations.

FIG. 6 illustrates an example wireless communication device in accordance with one or more implementations of the subject technology. The wireless communication device 600 may comprise a radio-frequency (RF) antenna 610, a receiver 620, a transmitter 630, a baseband processing module 640, a memory 650, a processor 660, a local oscillator generator (LOGEN) 670, and a power supply 680. In various embodiments of the subject technology, one or more of the blocks represented in FIG. 6 may be integrated on one or more semiconductor substrates. For example, the blocks 620-670 may be realized in a single chip or a single system on chip, or may be realized in a multi-chip chipset.

The RF antenna 610 may be suitable for transmitting and/or receiving RF signals (e.g., wireless signals) over a wide range of frequencies. Although a single RF antenna 610 is illustrated, the subject technology is not so limited.

The receiver 620 may comprise suitable logic circuitry and/or code that may be operable to receive and process signals from the RF antenna 610. The receiver 620 may, for example, be operable to amplify and/or down-covert received wireless signals. In various embodiments of the subject technology, the receiver 620 may be operable to cancel noise in received signals and may be linear over a wide range of frequencies. In this manner, the receiver 620 may be suitable for receiving signals in accordance with a variety of wireless standards. Wi-Fi, WiMAX, Bluetooth, and various cellular standards.

The transmitter 630 may comprise suitable logic circuitry and/or code that may be operable to process and transmit signals from the RF antenna 610. The transmitter 630 may, for example, be operable to up-covert baseband signals to RF signals and amplify RF signals. In various embodiments of the subject technology, the transmitter 630 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 630 may be operable to provide signals for further amplification by one or more power amplifiers.

The duplexer 612 may provide isolation in the transmit band to avoid saturation of the receiver 620 or damaging parts of the receiver 620, and to relax one or more design requirements of the receiver 620. Furthermore, the duplexer 612 may attenuate the noise in the receive band. The duplexer may be operable in multiple frequency bands of various wireless standards.

The baseband processing module 640 may comprise suitable logic, circuitry, interfaces, and/or code that may be operable to perform processing of baseband signals. The baseband processing module 640 may, for example, analyze received signals and generate control and/or feedback signals for configuring various components of the wireless communication device 600 such as the receiver 620. The baseband processing module 640 may be operable to encode, decode, transcode, modulate, demodulate, encrypt, decrypt, scramble, descramble, and/or otherwise process data in accordance with one or more wireless standards.

The processor 660 may comprise suitable logic, circuitry, and/or code that may enable processing data and/or controlling operations of the wireless communication device 600. In this regard, the processor 660 may be enabled to provide control signals to various other portions of the wireless communication device 600. The processor 660 may also control transfers of data between various portions of the wireless communication device 600. Additionally, the processor 660 may enable implementation of an operating system or otherwise execute code to manage operations of the wireless communication device 600.

The memory 650 may comprise suitable logic, circuitry, and/or code that may enable storage of various types of information such as received data, generated data, code, and/or configuration information. The memory 650 may comprise, for example, RAM, ROM, flash, and/or magnetic storage. In various embodiment of the subject technology, Information stored in the memory 650 may be utilized for configuring the receiver 620 and/or the baseband processing module 640.

The local oscillator generator (LOG EN) 670 may comprise suitable logic, circuitry, interfaces, and/or code that may be operable to generate one or more oscillating signals of one or more frequencies. The LOGEN 670 may be operable to generate digital and/or analog signals. In this manner, the LOGEN 670 may be operable to generate one or more clock signals and/or sinusoidal signals. Characteristics of the oscillating signals such as the frequency and duty cycle may be determined based on one or more control signals from, for example, the processor 660 and/or the baseband processing module 640.

In operation, the processor 660 may configure the various components of the wireless communication device 600 based on a wireless standard according to which it is desired to receive signals. Wireless signals may be received via the RF antenna 610 and amplified and down-converted by the receiver 620. The baseband processing module 640 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 650, and/or information affecting and/or enabling operation of the wireless communication device 600. The baseband processing module 640 may modulate, encode and perform other processing on audio, video, and/or control signals to be transmitted by the transmitter 630 in accordance to various wireless standards. The power supply 680 may provide one or more regulated rail voltages (e.g., $V_{DD}$) for various circuitries of the wireless communication device 600. In one or more implementations of the subject technology, the power supply 680 may include a multi-input switching charger circuit (e.g., 200A of FIG. 2A) using a pre-charging switch 240, or a multi-input switching charger circuit (e.g., 300 of FIG. 3) using bulk-connection switches S1 and S2, as described above.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A circuit for a switching charger, the circuit comprising:
 a plurality of input supply nodes, each of the plurality of input supply nodes connectable to a power source;
 a plurality of charging paths, each of the plurality of charging paths including a middle node connected to a coupling switch and a pass transistor, wherein the coupling switch is configured to activate a corresponding charging path of the plurality of charging paths; and
 a pre-charging switch coupled to a corresponding middle node of each of the plurality of charging paths, wherein the pass transistor of an activated one of the plurality of charging paths is configured to provide a switching voltage at an input of a charging sub-circuit, and wherein the pre-charging switch is configurable to pre-charge a middle node of a non-activated path to a high voltage to prevent an unwanted high current passing through a body diode of a corresponding pass transistor of the non-activated path.

2. The circuit of claim 1, wherein pass transistors of the plurality of charging paths are coupled to a switching circuit that is configured to control the pass transistor of the activated one of the plurality of charging paths to provide a switching voltage at an input of the charging sub-circuit, wherein the charging sub-circuit comprises an inductor and a capacitor.

3. The circuit of claim 1, wherein the power source comprises one of an adaptor, a powermat, a universal-serial bus (USB), or a wireless power dongle.

4. The circuit of claim 1, wherein the coupling switch comprises an NMOS transistor, and wherein a source node of the NMOS transistor is coupled to an input supply node of a corresponding charging path of the plurality of charging paths.

5. The circuit of claim 1, wherein the pass transistor comprises an NMOS transistor.

6. The circuit of claim 5, wherein an anode of a body diode of the pass transistor comprises a bulk of the NMOS transistor.

7. The circuit of claim 6, further comprising a switch configured to reverse a direction of the body diode by connecting the bulk of the NMOS pass transistor to a drain node of the NMOS pass transistor.

8. The circuit of claim 1, wherein the pre-charging switch is coupled to the corresponding middle node of each of the plurality of charging paths through one or more coupling resistors.

9. The circuit of claim 1, wherein the high voltage comprises a voltage of an input supply node coupled to the activated one of the plurality of charging paths.

10. A method for providing a multi-input switching charger, the method comprising:
coupling each of a plurality of charging paths through a respective coupling switch to one of a plurality of input supply nodes configured to be coupled to a power source;
coupling a middle node of each of the plurality of charging paths to the respective coupling switch and to a pass transistor, wherein the respective coupling switch is configurable to activate a corresponding charging path of the plurality of charging paths;
coupling a pre-charging switch to a corresponding middle node of each of the plurality of charging paths;
configuring the pass transistor of an activated one of the plurality of charging paths to provide a switching voltage at an input of a charging sub-circuit; and
configuring the pre-charging switch to pre-charge a middle node of a non-activated path to a high voltage to prevent an unwanted high current passing through a body diode of a corresponding pass transistor of the non-activated path.

11. The method of claim 10, further comprising coupling pass transistors of the plurality of charging paths to a switching circuit that is configured to control the pass transistor of the activated one of the plurality of charging paths to provide a switching voltage at an input of the charging sub-circuit, wherein the charging sub-circuit comprises an inductor and a capacitor.

12. The method of claim 10, wherein coupling each of the plurality of input supply nodes comprises coupling each of the plurality of input supply nodes to one of an adaptor, a powermat, a universal-serial bus (USB), or a wireless power dongle.

13. The method of claim 10, wherein the coupling switch comprises an NMOS transistor, and wherein the method further comprises coupling a source node of the NMOS transistor to an input supply node of a corresponding charging path of the plurality of charging paths.

14. The method of claim 10, wherein the pass transistor comprises an NMOS transistor, and wherein the method further comprises coupling a drain node of the NMOS transistor to a middle node of a corresponding charging path of the plurality of charging paths.

15. The method of claim 14, wherein an anode of a body diode of the pass transistor comprises a bulk of the NMOS transistor, wherein a cathode of the body diode of the pass transistor comprises an n-diffusion source, and wherein the method further comprises connecting the cathode of the body diode of the pass transistor to the middle node of a respective charging path.

16. The method of claim 15, further comprising configuring a switch to reverse a direction of the body diode by connecting the bulk of the NMOS pass transistor to a drain node of the NMOS pass transistor.

17. The method of claim 10, further comprising coupling the pre-charging switch to the corresponding middle node of each of the plurality of charging paths through one or more coupling resistors, and activating the pre-charging switch for a pre-determined period of time prior to provision of the switching voltage at the input of the charging circuit.

18. The method of claim 10, wherein the high voltage comprises a voltage of an input supply node coupled to the activated one of the plurality of charging paths, wherein pre-charging the middle node of the non-activated path facilitates reverse biasing of the body diode of the corresponding pass transistor of the non-activated path, and wherein the method further comprises conductively coupling the activated one of the plurality of charging paths to a corresponding input supply node.

19. A communication device, comprising:
a multi-input switching charger circuit comprising:
a plurality of input supply nodes, each of the plurality of input supply nodes connectable to a power source;
a plurality of charging paths, each of the plurality of charging paths including a middle node connected to a coupling switch and a pass transistor, wherein the coupling switch is configured to activate a corresponding charging path of the plurality of charging paths; and
a pre-charging switch coupled to a corresponding middle node of each of the plurality of charging paths,
wherein the pass transistor of an activated one of the plurality of charging paths is configured to provide a switching voltage at an input of a charging sub-circuit, and wherein the pre-charging switch is configurable to pre-charge a middle node of a non-activated path to a high voltage to prevent an unwanted high current passing through a body diode of a corresponding pass transistor of the non-activated path.

20. The communication device of claim 19, wherein the coupling switch comprises an NMOS transistor.

21. The communication device of claim 20, wherein a source node of the NMOS transistor is coupled to an input supply node of a corresponding charging path of the plurality of charging paths.

22. (Previously Presented The communication device of claim 20, wherein a drain node of the NMOS transistor is coupled to a middle node of a corresponding charging path of the plurality of charging paths.

23. The communication device of claim 20, wherein an anode of a body diode of the pass transistor comprises a bulk of the NMOS transistor.

24. The communication device of claim 23, wherein a cathode of the body diode of the pass transistor comprises an n-diffusion source connected to the middle node of a respective charging path.

25. The circuit of claim 5, wherein a drain node of the NMOS transistor is coupled to a middle node of a corresponding charging path of the plurality of charging paths.

26. The circuit of claim 5, wherein a cathode of a body diode of the pass transistor comprises an n-diffusion source connected to the middle node of a respective charging path.

27. The circuit of claim 8, wherein the pre-charging switch is activated for a pre-determined period of time prior to provision of the switching voltage at the input of the charging circuit.

28. The circuit of claim 1, wherein pre-charging the middle node of the non-activated path facilitates reverse biasing of a body diode of the corresponding pass transistor of the non-activated path.

29. The circuit of claim 1, wherein the activated one of the plurality of charging paths is conductively coupled to a corresponding input supply node.

\* \* \* \* \*